No. 692,361. Patented Feb. 4, 1902.
W. B. ROWLEY.
APPARATUS FOR MOLDING HOLLOW ARTICLES IN CLAY OR OTHER PLASTIC MATERIALS.
(Application filed Oct. 28, 1901.)
(No Model.) 2 Sheets—Sheet 2.
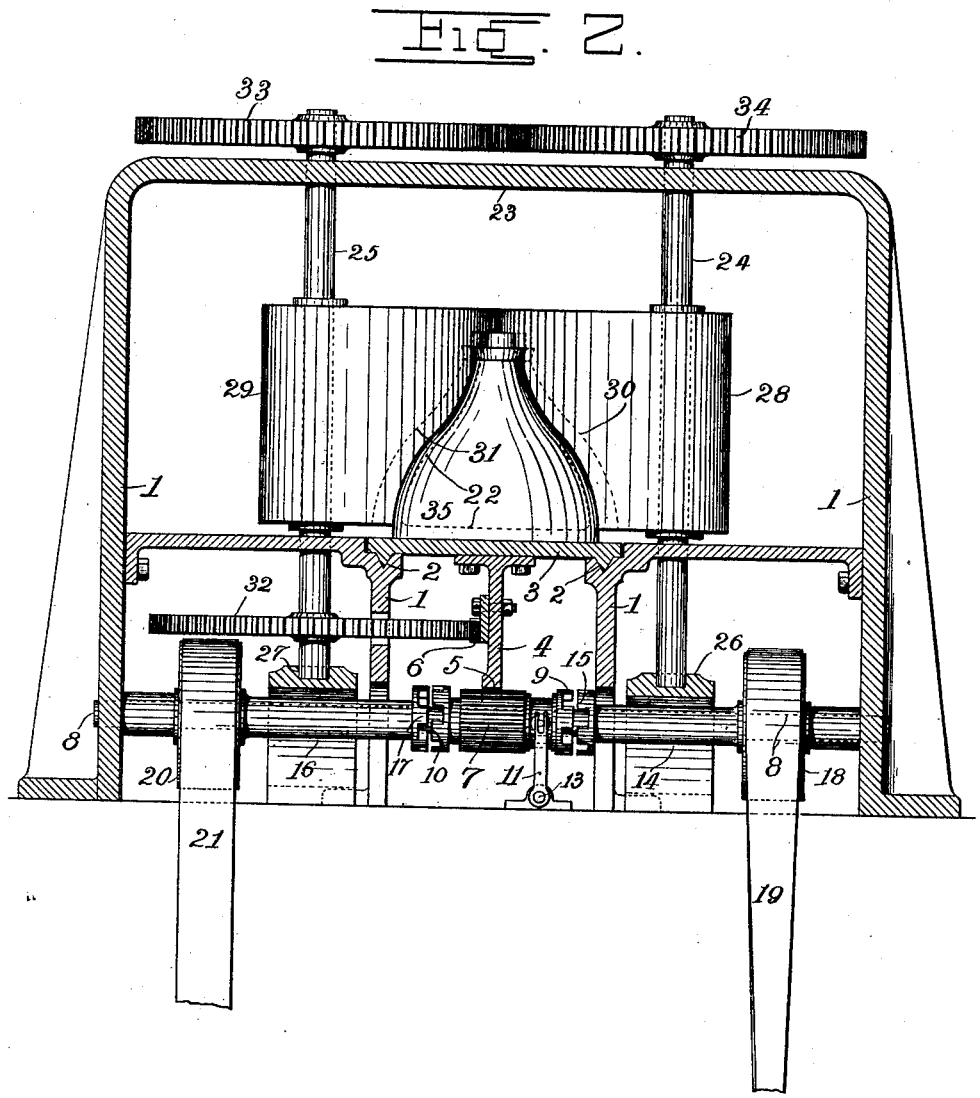
WITNESSES: INVENTOR:

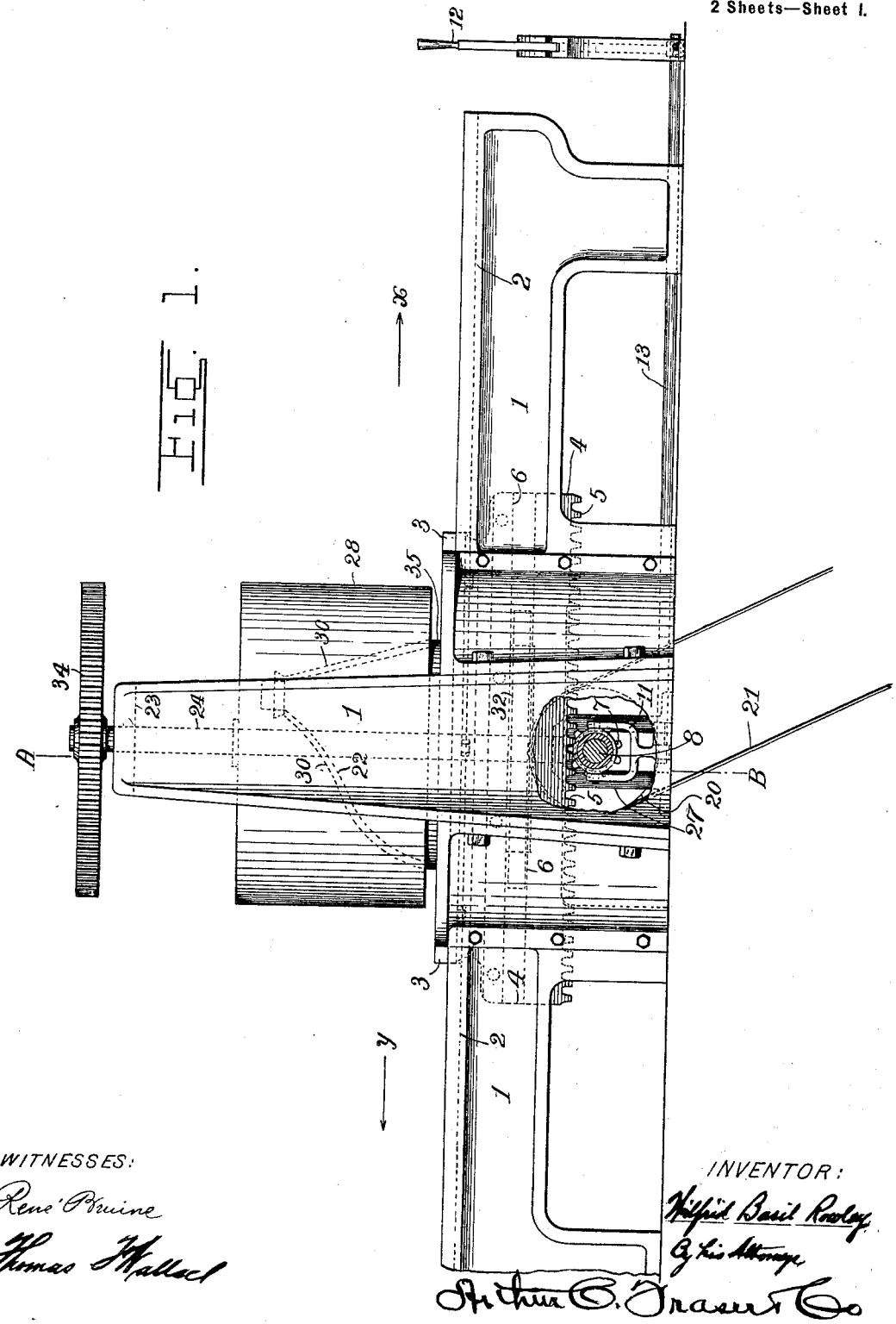

UNITED STATES PATENT OFFICE.

WILFRID BASIL ROWLEY, OF ROCKVILLE, SWADLINCOTE, ENGLAND, ASSIGNOR OF THREE-FOURTHS TO SAMUEL HUNT ROWLEY, MOSES JAMES ADAMS, AND THOMAS TILL, OF SWADLINCOTE, ENGLAND.

APPARATUS FOR MOLDING HOLLOW ARTICLES IN CLAY OR OTHER PLASTIC MATERIALS.

SPECIFICATION forming part of Letters Patent No. 692,361, dated February 4, 1902.

Application filed October 28, 1901. Serial No. 80,224. (No model.)

*To all whom it may concern:*

Be it known that I, WILFRID BASIL ROWLEY, manufacturer, of Rockville, Swadlincote, in the county of Derby, England, have made an invention for Improvements in Apparatus for Molding Hollow Articles in Clay or other Plastic Material, of which the following is a specification.

This invention relates to apparatus for molding hollow articles in plastic material, and more particularly in clay, for the manufacture of articles of earthenware.

In the specification of United States Letters Patent No. 667,954, granted to Samuel Hunt Rowley and Thomas Till, of Swadlincote, England, there is described a novel apparatus for molding hollow articles in clay or other plastic material, said apparatus consisting of a revolving or rocking matrix and a mold which moves in a rectilinear direction in connection with said matrix. With the apparatus described in the specification of said Letters Patent certain hollow articles of earthenware, such as water-closet pans, have to be molded in two or more parts, which are then subsequently connected together to form the finished article.

Now the present invention has for its object to provide apparatus operating in accordance with the principle disclosed in the specification of the aforesaid Letters Patent, but which will be capable of molding the body of hollow articles—for example, of the kind last referred to—in one piece.

According to the present invention the molding of the said articles is effected by laying on a mold or pattern of the interior of the finished article (allowing for shrinkage in drying and firing) a layer or slab of clay or other plastic material (hereinafter included in the term "clay") and causing said mold, together with the clay, to travel rectilinearly between and in connection with two or more revolving or rocking matrices constructed in the manner described in the specification of the aforesaid Letters Patent, so as to form thereby respectively opposite external portions of the finished article.

In molding baths and the like hollow articles the improved apparatus may be provided with two or more matrices for molding the bottom and the two sides and ends of the bath, respectively, and the matrices for molding the sides and ends may be mounted at any desired angle to the other matrix or matrices.

In molding chimney-pots and the like hollow articles the mold may be mounted longitudinally on a central spindle which is supported at its ends clear of the molding-matrices, which may be two or more in number and are arranged about a circle, so as to be able to operate on the clay on or in the mold on all sides simultaneously or otherwise.

The accompanying drawings illustrate by way of example a construction of apparatus according to the present invention comprising two matrices, which are suitable for molding articles such as closet-pans and the like.

Figure 1 is a side elevation of the apparatus. Fig. 2 is a vertical cross-section on the line A B of Fig. 1.

1 1 represents the framing of the machine, provided with two grooves 2 2, which serve to support and guide a horizontal traveling table 3. To this table is attached a downward extension 4, which extends along the table 3 and is provided on its horizontal under edge with a rack 5 and on one side with a horizontal side rack 6. The rack 5 works with a pinion 7, mounted loosely on a stationary horizontal shaft 8, fixed at its ends in the framing 1 1. The pinion 7 is formed on its opposite side faces with clutch-teeth 9 and 10, respectively, and is embraced by a fork 11, which is adapted to be rocked toward either side of the vertical center line of the pinion by means of a handle 12 through the medium of a rocking shaft 13.

14 is a sleeve mounted loosely on the shaft 8 to one side of the pinion 7 and formed with clutch-teeth 15 on its end nearest to the pinion clutch-teeth 9 and adapted to gear therewith when the pinion 7 is thrown over to that side by means of the handle 12. 16 is a similar sleeve, mounted loose on the shaft 8 on the other side of the pinion 7 and formed with clutch-teeth 17 on its end nearest to the pinion clutch-teeth 10 and adapted to gear therewith when the pinion 7 is thrown over to that side by the operation of the handle 12.

On the sleeve 14 is a fast pulley 18, driven by a crossed belt 19, and on the sleeve 16 is similarly provided a fast pulley 20, driven by an open belt 21. By this means the pinion 7 will be rotated in one direction when the handle 12 is operated to bring the pinion clutch-teeth 9 into engagement with the clutch-teeth 15 of the sleeve 14, and the same pinion 7 will be rotated in the opposite direction when the handle 12 is operated to bring the pinion clutch-teeth 10 into engagement with the clutch-teeth 17 of the sleeve 16. In Fig. 2 the pinion 7 is shown in its central disengaged or stationary position.

22 is a mold or core fixed centrally on one end of the table 3.

23 is a cross-piece cast with the framing.

24 25 are two vertical parallel shafts supported at top in bearings provided in the cross-piece 23 and at bottom in suitable bearings 26 27, respectively. On these shafts 24 25, which are set at a suitable distance from each other, are fixed, respectively, two molding-bodies 28 29, formed with molding-matrices 30 31 in accordance with the principles set forth in the aforesaid United States patent. On the lower end of the shaft 25, below the molding-body 29, is fixed a toothed wheel 32, working with the rack 6. On the upper end of the shaft 25, above the molding-body 29, is fixed a toothed wheel 33, working with a toothed wheel 34 of the same diameter fixed on the upper end of the shaft 24. The arrangement of the several parts as shown is such that when the pinion 7 is rotated by being shifted into engagement with the sleeve 14, driven in one direction by the belt 19 on the fast pulley 18, the table 3 will be caused, through the medium of the extension 4 and rack 5, to travel in the direction indicated by the arrow $x$ in Fig. 1, and the molding-bodies 28 29 will be caused by the coöperation of the rack 6 and wheel 32 and the wheels 33 and 34 to revolve at equal angular speeds simultaneously outward relatively to the plane of Fig. 2. When the pinion 7 is shifted into engagement with the sleeve 16, which is driven in the opposite direction by the belt 21 on the pulley 20, the pinion 7 will be rotated in that direction, and thus cause the table 3 to travel in the direction indicated by the arrow $y$ in Fig. 1, and the molding-bodies 28 29 will rotate simultaneously inward.

The relative positions of the molding-matrices 30 31 in the molding-bodies 28 29 are such that in the rotation of the latter the said molding-matrices will move in unison and coöperate to mold clay or other plastic material inserted between them to the shape of the article required.

In operating this apparatus for the purpose of molding hollow articles a layer of clay 35 is laid upon the mold or core 22 of the interior of the finished article to be molded and the mold so covered with clay is fixed on the table 3, which has been run out to one end of its travel for this purpose. Then the machine is started and the table 3, together with the clay-covered mold, is run to the other end of its travel, whereby the external surface of the clay 35 on the mold 22 during its passage between the molding-bodies 28 29 is molded by the action of the coöperating molding-matrices 30 31 into the shape of the exterior of the finished article required. As the internal surface of the clay has also assumed the shape of the interior of the finished article, the shell of the molded article will be in one piece of the exact thickness and shape required, allowing for shrinkage in the subsequent drying and firing operations.

What I claim, and desire to secure by Letters Patent, is—

1. In apparatus for molding hollow articles in clay or other plastic material, the combination of a mold having externally the shape of the interior of the article to be molded, a plurality of matrices adapted to rotate on axes located around said mold, and each adapted to mold a portion of the external shape of said article, a traveling support for said mold adapted to carry said mold in a straight line between said matrices, and means for causing said matrices to revolve in proper correlation with the movement of said support, whereby clay laid upon said mold is molded between said matrices into a single piece of the shape of the hollow article desired, substantially as set forth.

2. In apparatus for molding hollow articles in clay or other plastic material, the combination of a mold having externally the shape of the interior of the article to be molded, a plurality of molding-rolls adapted to revolve on their axes, located around said mold, each adapted to mold a portion of the external shape of the said article, a traveling table for carrying said mold between said molding-rolls and means for causing said molding-rolls to revolve in proper correlation with each other and with the corresponding portions of said mold, whereby clay laid upon said mold is molded by said molding-rolls into a single piece of the shape of the hollow article desired, substantially as set forth.

3. In apparatus for molding hollow articles in clay or other plastic material, the combination of a mold having externally the shape of the interior of the article to be molded, two molding-rolls adapted to revolve on axes located on opposite sides of said mold, each adapted to mold a portion of the external shape of said article, a table for carrying said mold in a straight line between said molding-rolls, and means whereby the said molding-rolls are caused to revolve on their axes so as to move their molding-surfaces in proper correlation with the corresponding portions of the said mold, whereby clay laid upon said mold is molded by said molding-rolls, into a single
5 piece of the shape of the hollow article desired, substantially as set forth.

In witness whereof I have hereunto signed my name in the presence of two subscribing witnesses.

WILFRID BASIL ROWLEY.

Witnesses:
F. M. BURTON,
H. EDGAR JONES.